C. LE G. FORTESCUE.
CIRCUIT INTERRUPTER.
APPLICATION FILED OCT 6, 1916.

1,392,137.

Patented Sept. 27, 1921.

WITNESSES:

P. J. Fitzgerald
J. A. Procter

INVENTOR
Charles Le G. Fortescue.
BY
Wesley G. Carr
ATTORNEY

UNITED STATES PATENT OFFICE.

CHARLES LeG. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER.

1,392,137.  Specification of Letters Patent.  Patented Sept. 27, 1921.

Application filed October 6, 1916. Serial No. 124,054.

*To all whom it may concern:*

Be it known that I, CHARLES LeG. FORTESCUE, a subject of the King of England, and a resident of Pittsburgh, in the county of Allegheny and State of Pennsylvania, have invented a new and useful Improvement in Circuit-Interrupters, of which the following is a specification.

My invention relates to automatic circuit interrupters and particularly to means for interrupting the circuit of the field-magnet winding of a dynamo-electric machine in response to changes in the armature reaction of the machine.

The object of my invention is to provide means that shall be adapted to reduce the voltage on, or open the circuit of, the field-magnet winding of a dynamo-electric machine when a ground or short circuit occurs upon the machine.

It is a well known fact that, when a short circuit or a ground occurs upon a dynamo-electric machine, its armature reaction quickly increases to cause the voltage of the field-magnet winding to vary by transformer action. It is also well known that it is desirable to quickly reduce the excitation of a dynamo-electric machine when a short circuit or a ground occurs thereon.

In view of the above, I provide a circuit comprising a condenser and a trip coil that I connect in shunt relation to the field-magnet winding. When the armature reaction changes quickly, the voltage impressed across the field-magnet winding will also change quickly, because of the transformer action therebetween, to permit the condenser to discharge a sufficiently large current to trip the field-winding circuit interrupter or to establish a closed-circuit connection across the field-magnet winding for the purpose of quickly reducing the field excitation.

Figure 1:
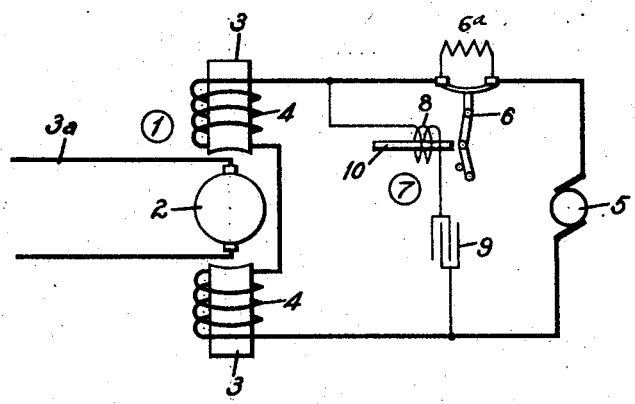
Figure 2:
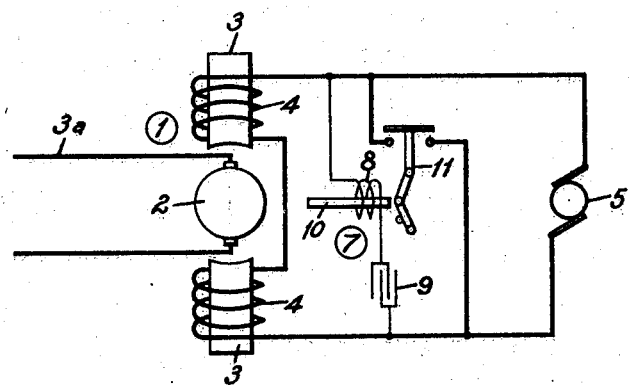

Figure 1 of the accompanying drawings is a diagrammatic illustration of a dynamo-electric machine embodying my invention, and Fig. 2 is a diagrammatic view of a dynamo-electric machine embodying a modified form of my invention.

A dynamo-electric machine 1 comprises an armature 2, field magnet poles 3 having windings 4 thereon, and a direct-current generator 5 for supplying energy to the field-magnet windings. The armature 2 of the generator 1 is operatively connected to an electric distributing circuit $3^a$. A circuit interrupter 6 is connected in circuit with the windings 4 in order that the same may be deënergized or open-circuited under predetermined conditions.

A circuit 7, comprising a trip coil 8 and a condenser 9, is connected in shunt relation to the windings 4 and is so proportioned that, when the voltage across the windings 4 changes rapidly, the condenser 9 will discharge sufficient current to so energize the trip coil 8 that its movable core member 10 will trip the circuit interrupter 6. However, since the voltage applied to the windings 4 does not ordinarily change rapidly, the circuit interrupter 6 will not be tripped unless some abnormal condition obtains in the circuit $3^a$. That is, if a ground or short circuit occurs on the circuit $3^a$, the armature reaction of the generator 1, which may be either an alternating or a direct-current generator, increases rapidly to thus induce a relatively high voltage in the field-magnet windings 4. Since the change in voltage in the field-magnet windings 4 is relatively quick, the circuit interrupter 6 will be tripped by reason of the discharge of the condenser 9. A resistance $6^a$ is provided across the terminals of the circuit interrupter 6. Thus, the excitation of the windings 4 may be quickly reduced substantially to zero in order that the voltage of the generator 1 may so decrease that no destructive effects will obtain from the short circuit or ground.

In Fig. 2 of the drawings, I provide a close-circulating device 11 that is adapted to be controlled by the trip coil 10 which is connected in series with the condenser 9. The device 11 is adapted to produce a closed-circuit connection across the terminals of the windings 4 when a ground or a short circuit occurs upon the circuit $3^a$. Thus, the voltage across the windings 4 may be quickly reduced to substantially zero and no detrimental effects will obtain on the circuit $3^a$ by reason of the sustaining of the exciting voltage after the occurrence of the short circuit or ground thereon.

I do not limit my invention to the particular systems illustrated, as it may be variously modified without departing from the spirit and scope of the invention set forth in the appended claims.

I claim as my invention:

1. The combination with a dynamo-electric machine, and an electro-responsive device, of means electrically connected to the field-magnet winding only of the machine for permitting current to traverse the electro-responsive device only when a disturbance occurs in the armature of the machine.

2. The combination with a dynamo-electric machine, and an electro-responsive device, of a condenser connected in series with the electro-responsive device across the field-magnet winding only of the machine for permitting current to traverse the electro-responsive device only when a disturbance occurs in the armature of the machine.

3. The combination with a separately-excited dynamo-electric machine and an electro-responsive device, of means connected in series with the electro-responsive device to permit current to traverse the same only when the armature reaction of the machine so changes as to cause the voltage of the field-magnet winding to change rapidly.

4. The combination with a dynamo-electric machine and an electro-responsive device connected across the field-magnet winding only of the machine, of means for precluding current traversing the device under normal conditions of operation and for permitting current to traverse the same when a fault obtains on the armature of the machine.

5. The combination with a dynamo-electric machine, a circuit interrupter for the field-magnet winding thereof and an actuating winding for the interrupter, of a condenser connected in series with the actuating winding across the field-magnet winding only for permitting sufficient current to traverse the actuating winding to actuate the interrupter only when a fault obtains in the armature of the machine.

6. The combination with a dynamo-electric machine, of actuating means for a circuit interrupter electrically connected to the field-magnet winding only and adapted to be traversed by current only when a disturbance occurs on the armature of the machine.

7. The combination with a dynamo-electric machine, of actuating means for a circuit interrupter electrically connected to the field-magnet winding only and adapted to be traversed by current only when the armature reaction of the armature so changes that the voltage of the field-magnet winding changes rapidly.

8. The combination with a dynamo-electric machine and an electro-responsive device, of means electrically connected to the field-magnet winding only of the machine for permitting current to traverse the electro-responsive device only when a short circuit or a ground occurs upon the armature of the machine.

9. The combination with a dynamo-electric machine, a circuit interrupter and a trip coil therefor, of means connected to the field-magnet winding only for permitting current to traverse the trip coil only when the armature reaction of the machine so changes that the voltage of the field-magnet winding changes rapidly.

10. The combination with a separately-excited dynamo-electric machine, of means connected across the field-magnet winding thereof that is traversed by current to interrupt the circuit of the field-magnet winding only when a disturbance occurs on the armature of the machine.

11. The combination with a separately-excited dynamo-electric machine, of means connected across the field-magnet winding thereof that is traversed by current to reduce the voltage on the field-magnet winding only when a fault obtains on the armature thereof.

In testimony whereof, I have hereunto subscribed my name this 29th day of Sept., 1916.

CHARLES L$_\text{E}$G. FORTESCUE.